UNITED STATES PATENT OFFICE.

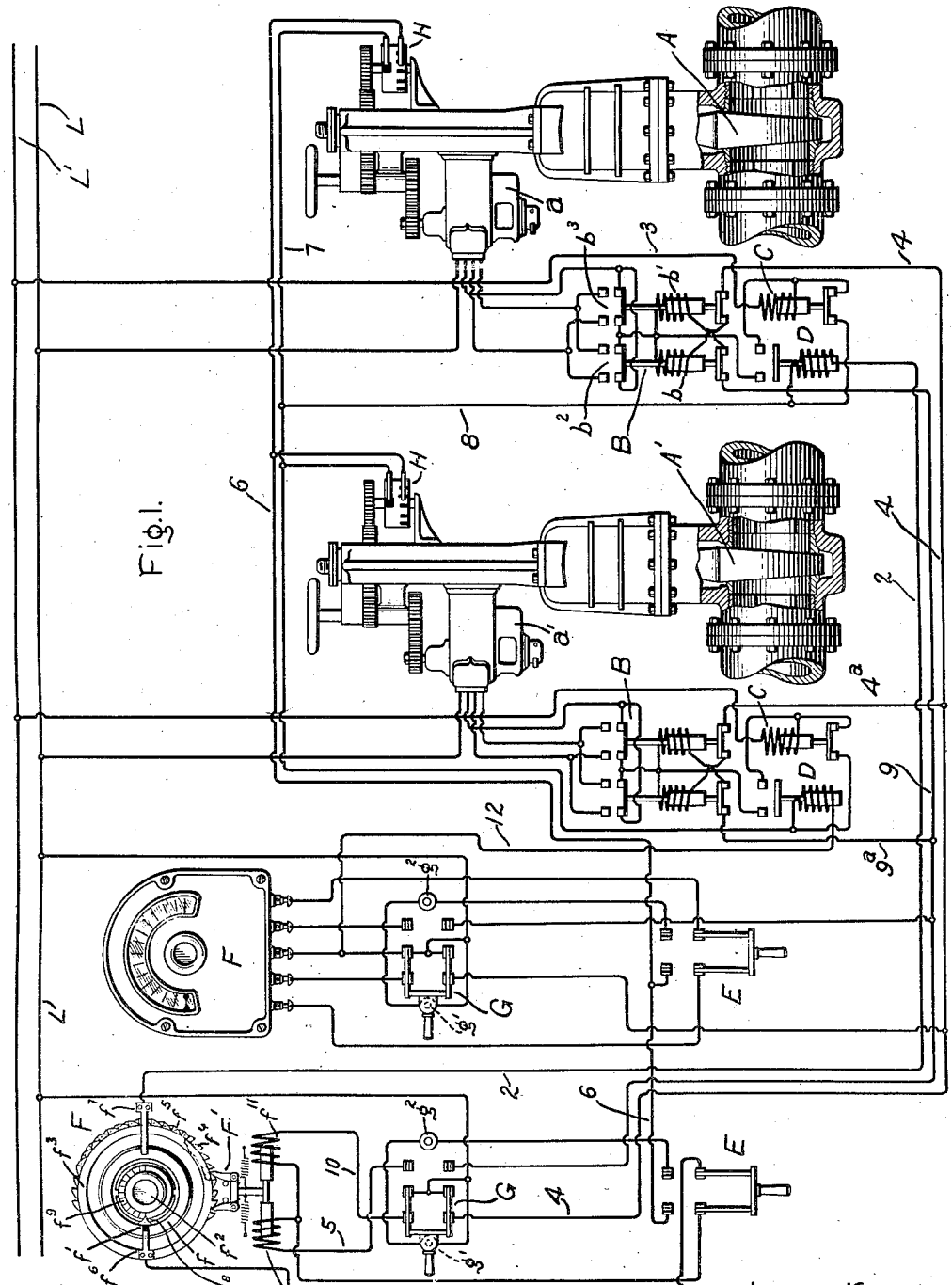

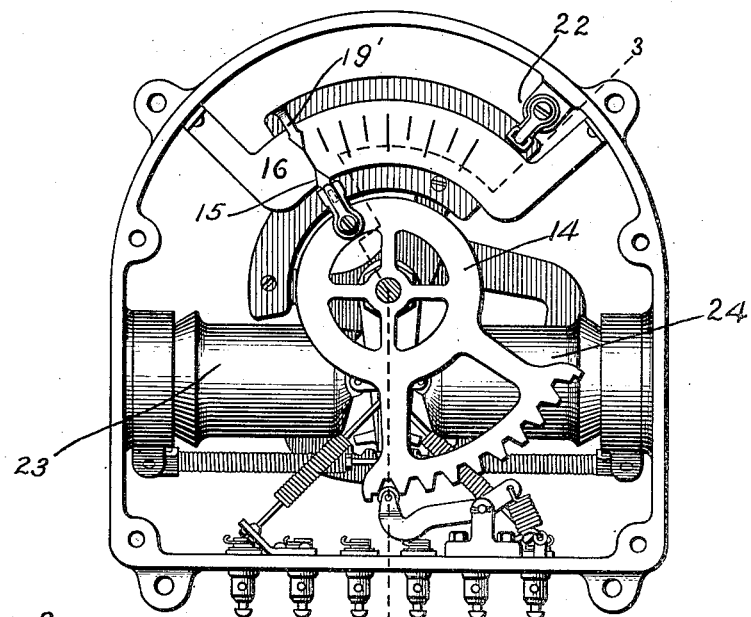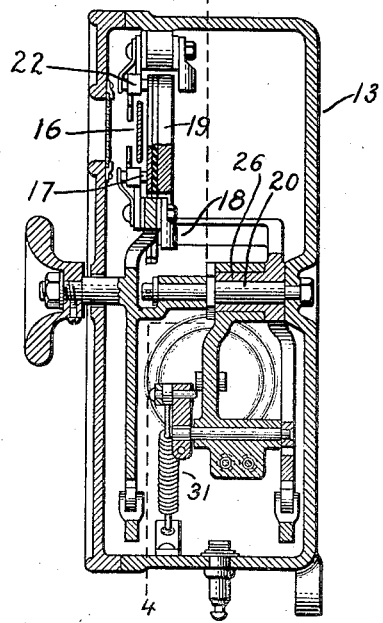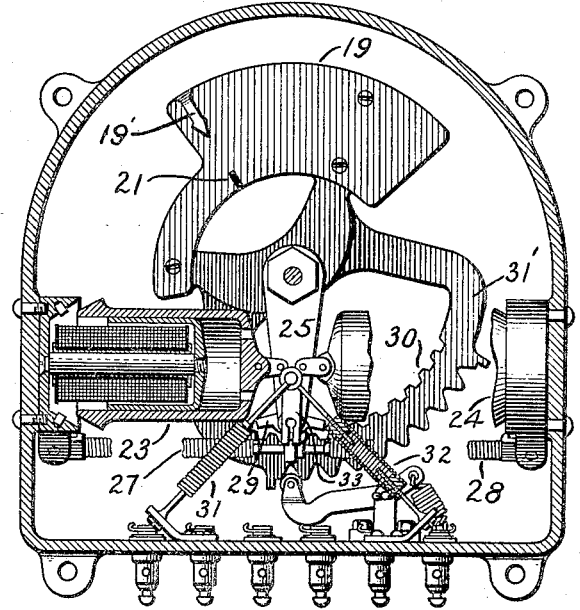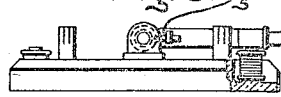

FREDERICK A. WILLARD, OF ROCHESTER, NEW YORK, ASSIGNOR TO GENERAL ELECTRIC COMPANY, A CORPORATION OF NEW YORK.

SYSTEM OF VALVE CONTROL.

No. 835,382.  Specification of Letters Patent.  Patented Nov. 6, 1906.

Application filed February 23, 1906. Serial No. 302,432.

*To all whom it may concern:*

Be it known that I, FREDERICK A. WILLARD, a citizen of the United States, residing at Rochester, in the county of Monroe, State of New York, have invented certain new and useful Improvements in Systems of Valve Control, of which the following is a specification.

The present invention relates to apparatus for operating valves or other similar devices by motors controlled from a distance, and has for its object to improve the construction and arrangement of parts of such apparatus.

It is frequently desirable to operate valves or other members from a distant control-station at which an indication shall be made of the various positions of the members to be moved during their traverse. Where a number of such members are to be controlled individually, it is evident that a large number of circuits may be required between the control-station and the motor-station, such an arrangement being not only objectionable by reason of the complexity of the system, but also expensive, both as to first cost and as to maintenance.

The present invention contemplates a novel construction and arrangement of parts whereby any desired number of motors or motor-driven members may be controlled at will from a distant station through a cable having but few wires. This is accomplished by providing a number of circuits which are common to all the apparatuses, together with a selective circuit for each apparatus, whereby the parts connected to the common circuit may be cut out or energized at will.

The present invention in its various aspects and its objects and advantages will be more fully understood from the following detailed description in connection with the accompanying drawings, wherein—

Figure 1 illustrates conventionally the motor-driven valves which are operated and controlled in accordance with the present invention. Figs. 2, 3, and 4 are views showing details of the indicating and circuit-breaking switch forming part of the master-controller at the control-station, and Fig. 5 shows one of the switches at the control-station.

Referring to the drawings, A and A' represent two valves adapted to be operated by motors $a$ and $a'$. L and L' indicate a source of current-supply. B B are main reversing-switches for the motors $a$ and $a'$, these switches being adapted to connect their respective motors to the source of current-supply for either direction of rotation. C C are overload switches in the circuits of the several motors. D D are relays for controlling the reversing-switches, as will be hereinafter described. These parts are all arranged at the valve-station, while at the control-station there is provided for each motor a master-controller apparatus comprising a main switch E, a combined circuit-breaker and indicator F, and a master reversing-switch G. The combined circuit-breaker and indicator may take any preferred form, being preferably of that type wherein the circuits are made by operating the device manually and again interrupted by operating the device automatically and step by step through means controlled from the valve. As shown in the diagram, a movable disk $f$, having a section of insulation $f'$, is adapted to be rotated manually by means of a knob or handle $f^2$. A second disk $f^3$ is provided with oppositely-arranged teeth $f^4 f^5$, whereby it may be automatically operated by means of a pawl mechanism F'. The disk $f^3$ is provided with a brush $f^6$, which bears upon the disk $f$, resting normally upon insulated section $f'$. A second brush $f^7$ also bears upon the disk $f$. Normally it will be seen that the two brushes are electrically insulated from each other; but when the knob $f^2$ is turned the brush $f^6$ leaves the insulated portion of the disk $f$ and electrical communication is established between the two brushes. This electrical communication continues until the disk $f^3$ has been rotated through such an angle that the brush $f^6$ is again brought over the insulated section in the other disk. The switches G are double-throw switches provided with springs $g$ (see Fig. 5) for normally holding them open. They may be held closed in one position or the other by means of electromagnets $g'$ and $g^2$.

In the drawings the parts are illustrated in their normal inoperative positions, both valves being closed. If it is desired, for example, to open valve A either wholly or partially, the knob $f^2$ of the left-hand master-control apparatus is turned until the pointer $f^8$ reaches a position on the dial $f^9$ corresponding to the position to which the valve is to be moved. The corresponding switch E is closed and the corresponding switch G is thrown to the left. The circuit may now be traced from line L, through electromagnets $g'$ and $g^2$, switch E, wire 1, through brush $f^6$, and thence through disk $f$ to brush $f^7$, through wire 2, through the actuating-coil of relay D, through the contacts of throttle-relay C and the coil of this relay, thence through wire 3 to line L'. The relay D is thus operated to close its contacts and a circuit may now be traced from line L through switch G, wire 4, actuating-coil $b$ of the reversing-switch, contacts of relay D, and thence through the coil of the overload-relay C and through wire 3 to line L'. The contacts $b^2$ of the reversing-switch are now closed and current is supplied to the motor in the proper direction for causing it to open the valve. A third circuit may also be traced from line L through switch G, wire 10, actuating-coil of magnet $f^{11}$ of the actuating device $F^7$, thence through switch E, wire 6, through the interrupter H, through wire 7, and thence by way of wire 8, through overload-relay C, and wire 3 to line L'. The circuit including the coil of magnet $f^{11}$ is made and interrupted in the usual manner by the interrupter H, so that as the valve opens the disk $f^3$ is turned step by step until the brush $f^6$ is again brought upon insulation $f'$, whereupon the electrical connection between the brushes $f^6$ and $f^7$ is broken and electromagnet $g'$, which is in series with these brushes, is deënergized. As soon as the spring $g$ is no longer restrained by electromagnet $g'$ it operates to throw the switch G open, and thus break all the control-circuits, causing the contacts $b^2$ of the reversing-switch to open and the relay D to drop. If it is desired to close the valve again or partially close it, the knob $f^2$ is turned in the opposite direction and the same circuits are completed as before, except that wire 4 and the coil $b$ of the reversing-switch remain deënergized and wire 9 and the coil $b'$ of the reversing-switch are energized instead. Thus the contacts $b^3$ of the reversing-switch are caused to close and the motor is driven in the opposite direction. Similarly, wire 5 and electromagnet $f^{10}$ are energized instead of wire 10 and electromagnet $f^{11}$, so that the disk $f^3$ is turned in a clockwise direction instead of in a counter-clockwise direction, as before. In order to operate valve A, the other set of master controlling devices is utilized, the relay for this valve being, however, energized through a separate wire 12, but the coils of the reversing-switch being connected to wires 4 and 9, respectively, through wires $4^a$ and $9^a$. Wires 6 and 7 are also utilized, since the two interrupters H H are connected to these wires in parallel. It will now be seen that there are six wires—namely, those numbered 2, 4, 6, 7, 9, and 12—extending between the control-station and the valve-station, four of these wires—namely, 4, 6, 7, and 9—being common to both systems and each system requiring only one other wire in addition to these four. It is evident that a great many valves may be operated from distant stations in this manner—namely, by connecting all the reversing-switches and interrupters in parallel to the common control-cable and providing for each additional valve a further wire for controlling the relay associated with that valve.

In Figs. 2, 3, and 4 I have illustrated a satisfactory form of circuit-breaker and indicator. In a casing 13 there is pivotally mounted a disk 14, having a pointer 15, which moves over a stationary dial 16. The disk 14 corresponds to the disk $f$ and the brush 17 and terminal 18 corresponding to the brush $f^7$. The brush 17 bears upon a disk 19, pivotally supported in the casing at 20 and having a section of insulation 21 in the path of the brush, the disk 19 and insulation 21 corresponding to the disk $f^3$ and the insulation $f'$ in Fig. 1. A stationary brush 22, corresponding to brush $f^6$, makes contact with the disk 19. This latter disk is also provided with a pointer 19', which moves across the dial 16. A pair of electromagnets 23 and 24, corresponding to electromagnets $f^{10}$ and $f^{11}$, are connected to an arm 25, which is loosely journaled upon the hub 26 of the disk 19. The arm 25 is normally held in a central position by means of springs 27 and 28. A double pawl 29 is pivotally secured to the lower end of the arm 25 and is adapted to coöperate with the teeth 30, formed in a segment 31, extending from the disk 19 for the purpose of oscillating the disk. The double pawl is normally maintained out of engagement with the teeth 30 by means of springs 31 and 32, fixed at one end to the casing and at the other end to an arm 33, projecting from the pawl. Whenever the electromagnet 23 is energized, the arm 25 is swung toward the left, placing spring 28 under tension. At the same time spring 32 is put under a slight tension, thereby throwing the right-hand nose of the pawl into engagement with one of the teeth 30. Thereupon when the electromagnet is deënergized the spring 28 returns the arm 25 to its central position and by reason of the engagement of the pawl with one of the teeth on the segment the disk 19 is moved forward one notch. In the same way the energization and subsequent deënergization of electromagnet 24 causes the disk 19 to be moved in the opposite direction step by step. The arrangement illustrated and described for operating the disk 19 forms no part of the present invention, being disclosed in an application of L. A. Tirill, Serial No. 223,706, filed September 8, 1904.

Although I have illustrated the present invention as applied to systems for operating valves, it is of course evident that the invention is not limited in its application to valve mechanisms, but may be employed wherever it is desired to operate and control a plurality of motors.

What I claim as new, and desire to secure by Letters Patent of the United States, is—

1. In combination, a plurality of motors, a circuit-controlling device for each motor, a common control-circuit for said circuit-controlling devices, a plurality of master-controllers connected to said control-circuit, a relay governing the operation of each of said circuit-controlling devices, and means associated with each of said master-controllers for controlling one of said relays.

2. In combination, a plurality of motors, a circuit-controlling device for each motor, actuating means for said circuit-controlling devices, a control-circuit to which said actuating means are connected in parallel, a plurality of master-controllers connected to said control-circuits, a relay governing the actuating means of each of said circuit-controlling devices, and means associated with each master-controller for controlling one of said relays.

3. In combination, a plurality of motors, a circuit-controlling device for each of said motors, actuating means for each controlling device, a control-circuit to which said actuating means are connected in parallel, master-controllers corresponding in number to said motors also connected in parallel to said control-circuit, a relay governing each of said circuit-controlling devices, and a relay-controlling circuit extending from each of said master-controllers to one of the relays.

4. In combination, a plurality of motors, a circuit-controlling device for each of said motors, actuating means for each of said circuit-controlling devices, a control-circuit to which said actuating means are connected in parallel, master-controllers corresponding in number to said motors also connected in parallel to said control-circuit, a relay arranged to connect and disconnect each of said actuating means from said control-circuit, and a relay-controlling circuit extending from each of said master-controllers to one of said relays.

5. In combination, a plurality of motors, a reversing-switch for each of said motors, a pair of electromagnets for operating each of said reversing-switches, control-circuits to which corresponding electromagnets are connected in parallel, master-controllers also connected in parallel to said control-circuits, a relay for controlling the circuit of each pair of electromagnets, and relay-controlling circuits extending from the master-controllers to corresponding relays.

6. In combination, a plurality of motors, a circuit-controlling device for each motor, a common control-circuit for said circuit-controlling devices, a plurality of master-controllers connected to said control-circuit, a relay governing the operation of each of said circuit-controlling devices, a relay-controlling circuit extending from said master-controllers to corresponding relays, and means governed by said motors for interrupting the circuits of corresponding relays.

7. In a system of control, a motor, a controller for said motor, an electromagnetically-maintained switch for governing the operation of said controller, a master-controller, means for operating said master-controller to energize the maintaining means for said switch, and means controlled by the motor for operating said master-controller to deënergize said maintaining means.

8. In a system of control, a motor, a circuit-controlling device, means for actuating said circuit-controlling device, a relay for governing said actuating means, a circuit for controlling said relay, a master-switch, means for operating said master-switch to complete the control-circuit for said relay, and means controlled by the motor for operating said master-switch to deënergize the control-circuit for said relay.

9. In a system of control, a motor, a circuit-controlling device, actuating means for said circuit-controlling device, a relay for governing said actuating means, a control-circuit for said relay, a master-controller having a plurality of running positions for energizing the control-circuit for the relay, and means controlled by the motor for operating said master-controller to interrupt the control-circuit for the relay after the motor has made a number of revolutions determined by the position of the master-controller.

10. In a system of control, a motor, a circuit-controlling device, a relay for governing said circuit-controlling device, separate control-circuits for said circuit-controlling device and said relay, a master-controller including two contact members, means for moving said members relatively to each other in order to energize the relay, and means controlled by the motor for producing a relative movement of said member to deënergize the relay.

11. In a system of control, a motor, a circuit-controlling device for said motor, a relay for governing said circuit-controlling device, separate control-circuits for said circuit-controlling device, and said relay, a master-controller and connections including two contacts, means for producing a relative movement between said contacts in order to energize the control-circuits for the relay, and means controlled by the motor for producing a relative movement between said contacts after the motor has made a predetermined number of revolutions in order to deënergize the relay.

12. In combination, a member to be moved, a motor connected thereto, a circuit-controlling device for said motor, actuating means for said circuit-controlling device, a relay for governing said actuating means, a master-switch having a plurality of running positions corresponding to positions of the member to be moved, connections between the master-switch and the relay for energizing the relay when the master-switch is in one of its running positions, and means for automatically operating said master-controller to deënergize the relay when said member reaches the position corresponding to the position determined by the position of the master-controller.

13. In combination, a member to be moved, an operating-motor, a reversing-switch for said motor, actuating means for said reversing-switch, a relay governing said actuating means, a master-switch having a plurality of running positions corresponding to definite positions of said member, connections between said master-switch and said relay for energizing the relay when the master-switch is in a running position, means for actuating said master-switch manually to any running position and means controlled by said member for operating said switch step by step to indicate the position of said member and to deënergize said relay when the said member has reached the position determined by the master-controller.

14. In a system of control, a plurality of motors, a circuit-controlling device for each motor, actuating means for each of said circuit-controlling devices, a relay for governing each of said actuating means, a control-circuit for each relay, a plurality of master-controllers, and a common control-circuit extending between said master-controllers and said actuating means, means associated with said master-controllers for energizing corresponding relays, and means controlled by each motor for operating the corresponding master-controller to deënergize the relay governed thereby.

15. In a system of control, a plurality of motors, a circuit-controlling device for each motor, actuating means for each circuit-controlling device, a control-circuit to which said actuating means are connected in parallel, a relay between each of said actuating means and said control-circuit, a plurality of master-controllers connected in parallel to said control-circuit, relay-controlling circuits between each of said master-controllers on corresponding relays, means for manually operating any one of said master-controllers to complete the several control-circuits associated therewith, and means controlled by each motor for operating the corresponding master-controller to deënergize the relay-controlling circuit connected thereto.

In witness whereof I have hereunto set my hand this 17th day of February, 1906.

FREDERICK A. WILLARD.

Witnesses:
 ISAAC A. WILE,
 KARL A. SCHICK.